United States Patent [19]

Scholl et al.

[11] Patent Number: 4,748,848
[45] Date of Patent: Jun. 7, 1988

[54] ACCELEROMETER

[75] Inventors: Stephen R. Scholl; Michael D. Valentine, both of Cincinnati, Ohio

[73] Assignee: Valentine Research, Inc., Cincinnati, Ohio

[21] Appl. No.: 4,055

[22] Filed: Jan. 16, 1987

[51] Int. Cl.$^4$ .................. G01P 15/13; G01P 15/08
[52] U.S. Cl. ...................... 73/517 B; 16/DIG. 13; 73/514
[58] Field of Search ............... 73/517 B, 514, 517 R; 16/225, DIG. 13; 264/274, 275

[56] References Cited

U.S. PATENT DOCUMENTS

| Re. 27,532 | 12/1972 | Morris | 73/517 R |
|---|---|---|---|
| 2,947,176 | 8/1960 | Perry | 73/517 R |
| 3,091,972 | 6/1963 | Johnston | 73/517 R |
| 3,165,934 | 1/1965 | Smoll et al. | 73/516 R |
| 3,323,372 | 6/1967 | Kister et al. | 73/517 B |
| 3,339,419 | 9/1967 | Wilcox | 73/517 B |
| 3,494,204 | 2/1970 | Whitehead | 73/517 B |
| 3,527,106 | 9/1970 | Hirtreiter | 73/517 B |
| 3,897,690 | 8/1975 | Hanson | 73/517 B |
| 4,018,491 | 4/1977 | Niedzwiecke et al. | 339/4 |
| 4,065,539 | 12/1977 | Nadel | 264/251 |
| 4,186,324 | 1/1980 | Hartzell, Jr. | 73/517 B |
| 4,277,895 | 7/1981 | Wiklund | 33/366 |
| 4,315,433 | 2/1982 | Edelman et al. | 73/517 R |
| 4,353,259 | 10/1982 | Schneider, Jr. | 73/653 |
| 4,354,134 | 10/1982 | Micheron | 310/800 |
| 4,495,815 | 1/1985 | Stratton et al. | 73/517 B |
| 4,507,965 | 4/1985 | Stratton et al. | 73/517 B |
| 4,649,748 | 3/1987 | Fukano et al. | 73/517 B |
| 4,651,075 | 3/1987 | Hobbs et al. | 73/517 B |
| 4,670,804 | 6/1987 | Kant et al. | 360/102 |

Primary Examiner—Stewart J. Levy
Assistant Examiner—Robert P. Bell
Attorney, Agent, or Firm—Killworth, Gottman, Hagan & Schaeff

[57] ABSTRACT

An accelerometer for measuring the acceleration of a body in the direction of a reference axis includes a support member, mountable on the body, and a magnet arrangement mounted on the support member which defines an air gap between pole surfaces extending generally parallel to the reference axis. The magnet provides magnetic flux across the air gap which coacts with a magnetic field produced an electromagnetic coil assembly mounted on a movable member. The movable member is mounted on the support member by a hinge which includes a piece of polymer film permitting the movable member to pivot with respect to the support member about a pivot axis generally perpendicular to the reference axis. The polymer film is molded into portions of the movable member and the support member.

15 Claims, 3 Drawing Sheets

ACCELEROMETER

BACKGROUND OF THE INVENTION

The present invention relates to an accelerometer and, more particularly, to an improved force balance accelerometer of simple, reliable construction.

Devices for measuring acceleration are used in various types of test equipment and, also, as components in numerous systems. In the simplest type of accelerometer, a mass is spring mounted on a reference frame. When the mass experiences acceleration, a force resulting from the acceleration moves the mass with respect to the frame by a distance related to the magnitude of the force. Measurement of the displacement of the mass from a reference position thus provides an indication of the magnitude of the acceleration in the direction of displacement. One such accelerometer, disclosed in U.S. Pat. No. 4,353,259, issued Oct. 12, 1982, utilizes a fiberoptic fiber as the mass, with the fiber being held at only one end. The opposite end of the fiber is free to deflect, and the amount of deflection, and therefore the magnitude of the deflecting acceleration, is determined by a plurality of appropriately positioned light detectors. Another such accelerometer is shown in U.S. Pat. No. 4,315,433, issued Feb. 16, 1982, to Edelman et al. The Edelman et al accelerometer utilizes a mass which is held between two sheets of piezoelectric polymer film. Deflection of the mass from a reference position is measured by changes in the piezoelectric properties of the film as the film is distorted in shape.

Such relatively simple accelerometers, open loop in operation, are subject to errors from a number of sources, including manufacturing errors, and errors resulting from thermal expansion of components. A more accurate type of prior art accelerometer has been developed which compensates for a number of these errors. Known as a force balance accelerometer, this type of device includes a proof mass which is mounted for free movement, usually pivotal movement, in response to experienced acceleration. An electromagnetic arrangement applies a restoring force to the proof mass which is sufficient to return it to a reference position. The level of current required to produce the restoring force provides a measure of the acceleration experienced by the proof mass.

Several types of mounting arrangements have been utilized with force balance accelerometers. U.S. Pat. No. 3,323,372, issued June 6, 1967, to Kistler et al discloses a device having a plurality of support wires which extend from the proof mass to a mounting frame. U.S. Pat. No. 2,947,176, issued Aug. 2, 1960, to Perry discloses an accelerometer having the proof mass mounted on a pair of leaf springs. U.S. Pat. No. 3,339,419, issued Sept. 5, 1967, to Wilcox, relates to an accelerometer having a proof mass supported by a cantilever groove arrangement which permits the somewhat thinner material in the region of the groove to flex.

It will be appreciated, however, that the above described mounting arrangements are all somewhat undesirable in that the restoring force applied to a deflected proof mass is a function both of the electromagnetically generated force and the spring constant of the mounting arrangement for the proof mass. Other devices, such as shown in U.S. Pat. No. 4,495,815, issued Jan. 29, 1985, to Stratton et al, utilize pivot bearing structures to mount the proof mass, which bearings eliminate the application of force to the proof mass by the spring mounting. Bearing arrangements, such as ball bearings and jeweled bearing mounts which have been utilized with prior art systems, however, are subject to wear and friction, and additionally are relatively expensive.

Accordingly, it is seen that there is a need for an improved accelerometer of the force balance variety which is simple and economical in construction, and reliable in operation.

SUMMARY OF THE INVENTION

The present invention meets these needs by providing an accelerometer for measuring the acceleration of a body in the direction of a reference axis comprising a support member, mountable on the body, a movable member, and a flexible film hinge. The hinge includes a piece of polymer film, engaged by the support member and the movable member, which permits the movable member to pivot about a pivot axis generally perpendicular to the reference axis. The accelerometer further includes electromagnetic means for applying a restoring force to the movable member to maintain the movable member in a reference position in opposition to an acceleration force applied thereto.

The flexible film hinge may include a piece of polymer film having a thickness of approximately 1 mil. The film, molded into the movable member and the support member, bridges a gap between the movable member and the support member. The gap is relatively small with respect to the width of the piece of polymer film in a direction parallel to the pivot axis, whereby movement, other than pivoting movement, is restricted. The polymer film may define a plurality of holes within the movable member and the support member, such that the piece of polymer film is firmly engaged thereby.

The accelerometer may comprise a support member, mountable on the body, and magnet means mounted on the support member which defines an air gap between pole surfaces, which surfaces extend generally parallel to the reference axis, with the magnet means providing magnetic flux across the air gap. A movable means, mounted on the support element, includes an electromagnetic coil assembly, movable in the air gap in a direction generally parallel to the reference axis.

A hinge means, including a piece of polymer film secured to the movable means and to the support member, permits the movable means to pivot with respect to the support member about a pivot axis generally perpendicular to the reference axis. As a consequence the movable member is moved out of a reference position with respect to the support member by an acceleration having a component in the direction of the reference axis and the movable member is returned to the reference position by a restoring force produced by supplying current to the electromagnetic coil assembly, the level of the current being related to the magnitude of the acceleration.

At least portions of the movable means and the support member may be made of polycarbonate plastic material, with the piece of polymer film being molded therein. The polymer film preferably comprises a polyimide resin film having a melting point in excess of the melting point of the polycarbonate plastic material.

The accelerometer for measuring the acceleration of a body in the direction of a reference axis comprises a support member, mountable on the body, first field means on the support element for providing a first magnetic field, a proof mass including a movable member and a second field means, mounted thereon, for providing a second magnetic field which interacts with the first magnetic field. The accelerometer further includes a flexible film hinge which is engaged by the support member and the movable member and which permits pivoting of the proof mass with respect to the support member about an axis generally perpendicular to the reference axis. The magnetic fields interact to keep the proof mass at a reference position and provide an indication of the acceleration of the body on which the support member is mounted in a direction parallel to the reference axis.

Accordingly, it is an object of the present invention to provide an accelerometer of the force balance type in which the movable member of the accelerometer is supported by a film hinge arrangement; to provide such an accelerometer in which portions of the movable member and the support member therefore are molded; to provide such an accelerometer in which the film hinge consists of a piece of polymer film which is sufficiently thin so as to bend with negligible friction and negligible opposing spring force.

Other objects and advantages of the invention will be apparent from the following description, the accompanying drawings and the appended claims.

DETAILED DESCRIPTION OF THE PREFERRED EMBODIMENTS

Figure 1:
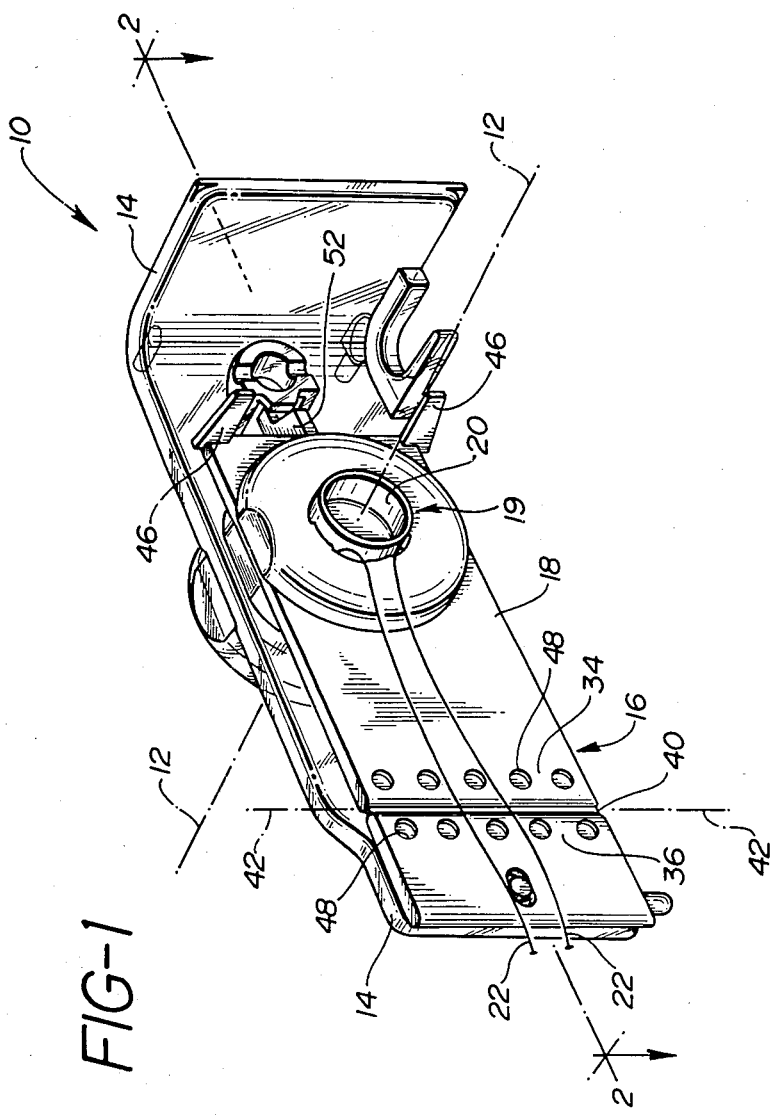
FIG. 1 is a perspective view of an accelerometer constructed according to the present invention.
Figure 2:
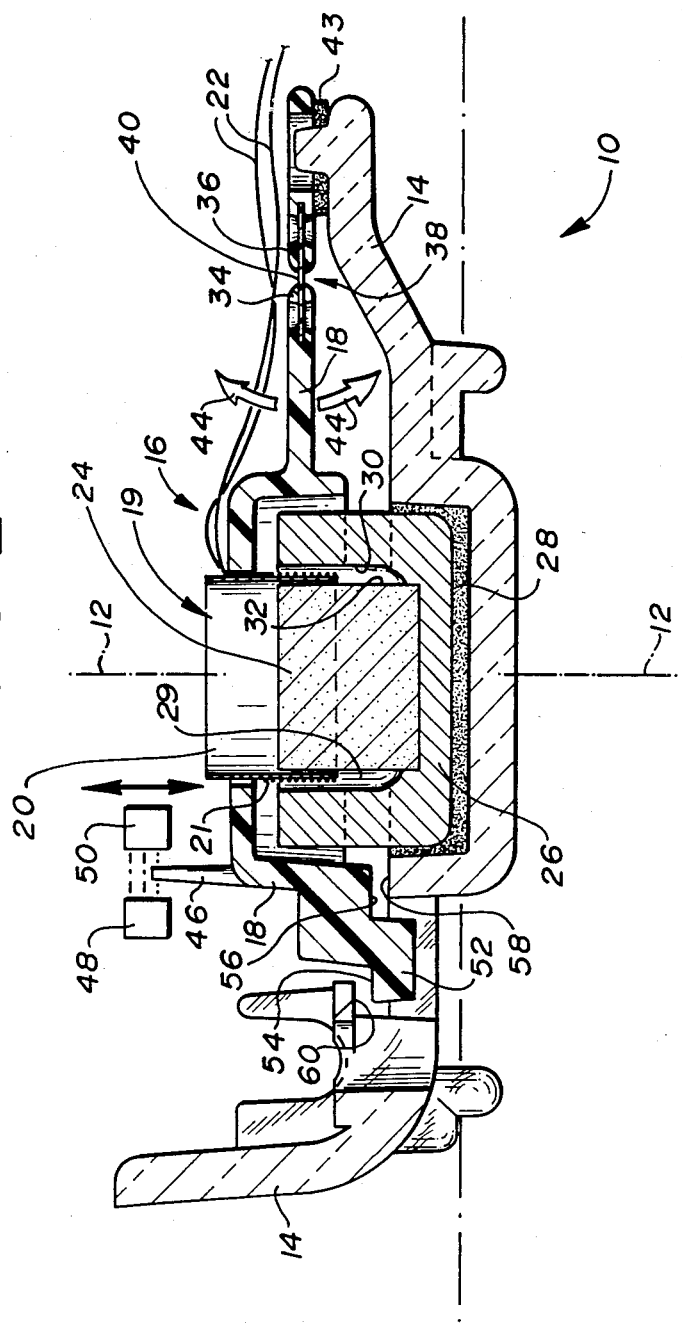
FIG. 2 is an enlarged sectional view taken generally along line 2—2 in FIG. 1.
Figure 3:
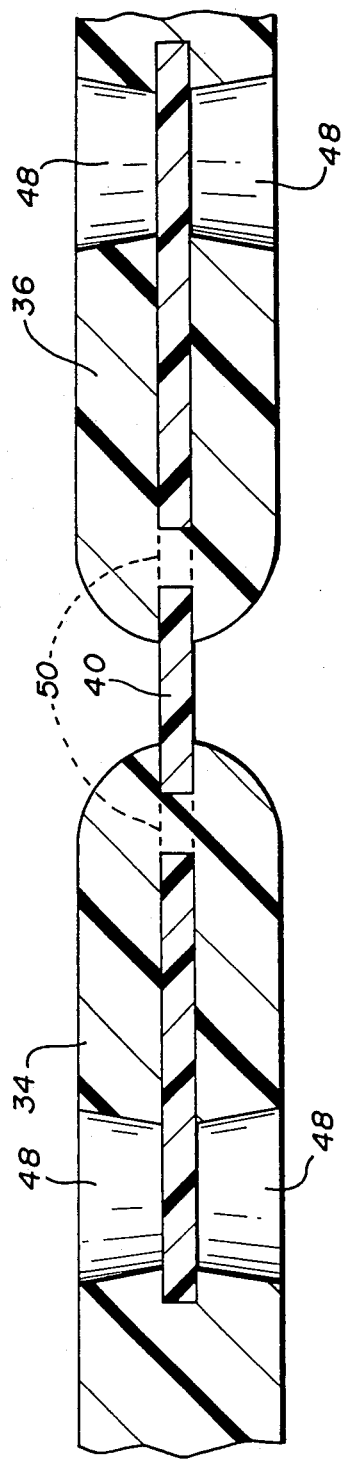
FIG. 3 is a sectional view, further enlarged, of the film hinge arrangement, also taken along line 2—2 in FIG. 1.

FIGS. 1-3 illustrate an accelerometer 10, constructed according to the present invention, which measures the acceleration of a body (not shown) upon which it is mounted in the direction of a reference axis 12. The accelerometer includes a support member 14 which is mountable on the body, and a proof mass 16 which includes a movable member means 18, mounted on the support member 14, and an electromagnetic coil assembly 19 including a spool 20 and a coil 21 of insulated wire, with supply leads 22 extending therefrom. Spool 20 extends through an opening in member 18 and is adhesively secured thereto. Leeds 22 are extremely thin and, therefore, do not affect movement of the proof mass 16 appreciably. A magnet means, including permanent magnet 24 and armature 26, is mounted on the support member 14 by a layer of adhesive 28, the thickness of which is exaggerated substantially in FIG. 2 for purposes of clarity. The magnet means defines an annular air gap 29 between opposing annular pole surfaces 30 and 32, which extend generally parallel to the reference axis 12. The magnet 24 provides a magnetic field which, as will be more fully described below, interacts with a magnetic field produced the electromagnetic coil assembly 19 so as to hold the proof mass 16 at a reference position.

Between portion 34 of the movable member 18 and portion 36 of the support member 14 is a flexible film hinge means 38 which includes a piece of polymer film 40 secured to the movable member 18 and to the support member 14. Film 40 permits the movable member 18 to pivot with respect to the support member 14 about a pivot axis 42 which is generally perpendicular with respect to the reference axis 12. Portion 36 of the support member is secured to the rest of the support member by an adhesive 43, the thickness of which is exaggerated in FIG. 2 for purposes of clarity.

When the support member 14 is mounted on a body to measure the acceleration experienced by the body, the proof mass 16 tends to be moved out of a reference position, depicted generally in FIG. 2, by the component of acceleration in the direction of the reference axis 12. Although the initial movement is in a direction parallel to the axis 12, the movement of the proof mass 16 is a pivotal movement, as indicated by arrows 44, with the film 40 flexing to permit pivoting. One of tabs 46 extends into the beam of a light from source 48, thus providing a means for preventing a portion of the beam from reaching a sensor 50. Appropriate control circuitry, responsive to sensor 50, senses the movement of the movable member 18 out of its reference position, and applies a sufficient current through leads 22 to create a magnetic field which interacts with the magnetic field produced by the magnet 24 to produce a force which tending to return the movable member 18 to its reference position. The magnitude of the current required to effect this return is a function of the position restoring force required and this, in turn, is directly related to the acceleration which the proof mass 16 experiences.

As may be noted, two tabs 46 extend from member 18, although only one source 48 and one sensor 50 are required to sense the movement of member 18. By the use of two tabs 46, the accelerometer 10 is capable of being mounted in a variety of positions on a body with the position of member 18 being detected by a source 48 and sensor 50 also mounted on the body. As an example, the lower tab 46 shown in FIG. 1 may be used for detection of the movement of member 18 in one application, with the accelerometer 10 of the present invention being inverted and the upper of the tabs 46 being utilized for detection of movement of the member 18 in a different application. Thus, a plurality of identical accelerometers contracted according to the present invention may be easily adapted to measure acceleration in several different directions in an acceleration measurement system.

The hinge means 38 of the present invention permits the pivoting of the movable means to occur without appreciable frictional loss and without a spring force being applied to the movable member 18. The film 40 deflects easily through the limited range of movement required for the proof mass 16 during operation of the accelerometer 10. It has been found that a relatively thin polymer film, preferably comprising a sheet of film 40 having a thickness of approximately 1 mil, provides the necessary degree of flexibility. A polymer film found to be particularly well adapted to this application is a polyimide resin film sold by E.I. duPont deNemours & Co., Inc., Wilmington, Del., under the trademark KAPTON. It has further been found to be desirable for the KAPTON film layer 40 to be molded into the portions 34 and 36 of movable member 18 and support member 14, respectively. Portions 34 and 36 are preferably made of polycarbonate plastic material having a melting temperature which is lower than that of film 40. As a consequence, the sheet of film 40 may be placed into an injection mold where the molding of portions 34 and 36 takes place, without causing sheet 40 to melt.

Preferably, a series of pins (not shown) hold film 40 in position in the injection mold. As a consequence, when the film 40 and portions 34 and 36 are removed from the mold, openings 48 remain.

The piece of polymer film 40 defines a plurality of holes 50 spaced along its width which are filled with plastic material from portions 34 and 36 during the injection molding process. These holes 50 ensure that film 40 is securely engaged by portions 34 and 36.

As will be noted, the width of the piece of polymer film 40 in a direction generally parallel to the pivot axis 42 is substantially greater than the spacing between portions 34 and 36. This limits the movement of the movable member 18 to the desired pivotal movement about axis 42. Movement of the member 18 in any other direction is undesirable, since rubbing of the coil 21 or the spool 20 against magnet 24 or armature 26 could result.

In operation, the movable member 18 actually experiences relatively little movement. Only a small movement from the reference position is required before an appropriate current is supplied to coil 21 via leads 22 to restore the proof mass 16 to its reference postion. A stop 52 extends from element 18 and defines surfaces 54 and 56 which contact stop surfaces 58 and 60, respectively to preclude excessive movement of member 18. Such movement may occur, for example, when the accelerometer is not in use and no current is being supplied to coil 21.

It will be appreciated that it is desirable that, when mass 16 is in its reference position, the center of gravity of the proof mass 16 be positioned along a line from the hinge 38 which is perpendicular to the reference axis 12, such that the initial movement of the center of gravity is in a direction parallel to the reference axis 12. Due to slight variations in accelerometer structure resulting from manufacturing tolerances, this may not be the case. The accelerometer 10 may therefore be adjusted slightly in its position on the body on which it is mounted to compensate for this misalignment. Alternatively, the misalignment may simply be measured and compensated electronically by associated circuitry.

The accelerometer of the present invention is highly reliable and rugged, as well as relatively inexpensive as compared to prior art force balance accelerometers utilizing jewel pivot movements. As a consequence, it will find numerous applications in various acceleration measuring applications. A number of variations in the accelerometer of the present invention may be utilized. For example, a permanent magnet arrangement may be mounted on the movable member 18 and an electromagnetic coil arrangement may be mounted on the support member 14.

Having described the invention in detail and by reference to preferred embodiment thereof, it will be apparent that other modifications and variations are possible without departing from the scope of the invention defined in the appended claims.

What is claimed is:

1. An accelerometer for measuring the acceleration of a body in the direction of a reference axis, comprising:
    a support member, mountable on said body,
    magnet means mounted on said support member and defining an air gap between pole surfaces, which surfaces extend generally parallel to said reference axis, said magnet means providing magnetic flux across said air gap,
    movable means, mounted on said support member and including an electromagnetic coil assembly movable in said air gap in a direction generally parallel to said reference axis, and
    hinge means, including a piece of polymer film molded into portions of said movable means and said support member to form a hinge section in said piece of polymer film extending between opposing ends of said portions, for permitting said movable means to pivot with respect to said support member about a pivot axis generally perpendicular to said reference axis, whereby said movable member is moved out of a reference position with respect to said support member by an acceleration having a component in the direction of said reference axis and said movable member is returned to said reference position by a restoring force produced by supplying current to said electromagnetic coil assembly, the level of said current being related to the magnitude of said acceleration.

2. The accelerometer of claim 1 in which said polymer film is a sheet of film having a thickness of approximately 1 mil.

3. The accelerometer of claim 1 in which at least said portions of said movable means and said support member are made of polycarbonate plastic material, with said piece of polymer film being injection molded therein, and in which said polymer film comprises a polyimide resin film having a melting point in excess of the melting point of said polycarbonate plastic material.

4. The accelerometer of claim 1 in which the length of said hinge portion of said piece of polymer film in a direction generally parallel to said pivot axis is substantially greater than the width of said hinge portion between said portions, whereby movement of said movable means is substantially limited to pivotal movement about said pivot axis.

5. The accelerometer of claim 1 in which said piece of polymer film defines a plurality of holes in the parts thereof molded into said portions of said movable means and said support member, such that said film is firmly engaged by said portions.

6. An accelerometer for measuring the acceleration of a body in the direction of a reference axis, comprising:
    a support member, mountable on said body,
    first field means on said support element for providing a first magnetic field,
    a proof mass including a movable member and second field means, mounted thereon, for providing a second magnetic field which interacts with said first magnetic field, and
    a flexible film hinge, including a piece of polymer film molded into portions of said support member and said movable member, permitting pivoting of said proof mass with respect to said support member about an axis generally perpendicular to said reference axis, whereby said magnetic fields interact to keep said proof mass at a reference position and provide an indication of the acceleration of the body on which the support member is mounted in a direction parallel to said reference axis.

7. The accelerometer of claim 6 in which said flexible film hinge includes a sheet of polymer film having a thickness of approximately 1 mil.

8. The accelerometer of claim 6 in which said piece of polymer film bridges a gap between said movable member and said support member which is relatively small with respect to the width of the piece of polymer film in a direction parallel to the axis about which said proof mass pivots, whereby movement of said proof mass, other than pivoting movement, is restricted.

9. The accelerometer of claim 6 in which said polymer film defines a plurality of holes within said movable member and said support member, such that said polymer film is firmly engaged thereby during molding.

10. An accelerometer for measuring the acceleration of a body in the direction of a reference axis, comprising:
   a support member, mountable on said body,
   a movable member,
   a flexible film hinge, including a piece of polymer film molded into portions of said support member and said movable member, and permitting pivoting of said movable member about a pivot axis generally perpendicular to said reference axis, and
   means for applying a restoring force to said movable member to maintain said movable member in a reference position in opposition to an acceleration force applied thereto.

11. The accelerometer of claim 10 in which said flexible film hinge includes a piece of polymer film having a thickness of approximately 1 mil.

12. The accelerometer of claim 12 in which said piece of polymer film bridges a gap between said movable member and said support member which is relatively small with respect to the width of the piece of polymer film in a direction parallel to the axis about which said movable member pivots, whereby movement, other than pivoting movement, is restricted.

13. The accelerometer of claim 12 in which said polymer film defines a plurality of holes within said movable member and said support member, such that said piece of polymer film is firmly engaged during molding.

14. An accelerometer for measuring the acceleration of a body in the direction of a reference axis, comprising:
   a support member, mountable on said body,
   a movable member,
   a hinge, molded into portions of said support member and said movable member, and permitting pivoting of said movable member about a pivot axis generally perpendicular to said reference axis,
   means for applying a restoring force to said movable member to maintain said movable member in a reference position in opposition to an acceleration force applied thereto,
   means for providing a beam of light adjacent said movable member,
   sensor means for sensing said beam of light, and
   a plurality of tab means, at least one such tab means preventing a portion of said beam from reaching said sensor means upon movement of said movable member from said reference position.

15. The accelerometer of claim 14 in which said tab means extend from the end of said movable member opposite and hinge in a direction generally parallel to said reference axis.

* * * * *

UNITED STATES PATENT AND TRADEMARK OFFICE
CERTIFICATE OF CORRECTION

PATENT NO. : 4,748,848

DATED : June 7, 1988

INVENTOR(S) : Stephen R. Scholl, Michael D. Valentine

It is certified that error appears in the above-identified patent and that said Letters Patent is hereby corrected as shown below:

Col. 7, line 27, "12" (second occurrence) should be --11--.

Signed and Sealed this

Twenty-second Day of November, 1988

Attest:

DONALD J. QUIGG

*Attesting Officer*  *Commissioner of Patents and Trademarks*